(12) United States Patent
Weatherspoon

(10) Patent No.: US 7,519,115 B2
(45) Date of Patent: Apr. 14, 2009

(54) VIDEO COMPRESSION METHOD AND APPARATUS

(75) Inventor: Sultan Weatherspoon, Vancouver, WA (US)

(73) Assignee: Duma Video, Inc., Vancouver, WA (US)

( * ) Notice: Subject to any disclaimer, the term of this patent is extended or adjusted under 35 U.S.C. 154(b) by 1110 days.

(21) Appl. No.: 10/404,952

(22) Filed: Mar. 31, 2003

(65) Prior Publication Data

US 2005/0008077 A1   Jan. 13, 2005

(51) Int. Cl.
  *H04N 7/12*    (2006.01)
  *H04N 11/02*   (2006.01)
  *H04N 11/04*   (2006.01)
  *H04B 1/66*    (2006.01)

(52) U.S. Cl. .................................. 375/240.12
(58) Field of Classification Search .................. None
  See application file for complete search history.

(56) References Cited

U.S. PATENT DOCUMENTS

| | | | |
|---|---|---|---|
| 4,772,956 A * | 9/1988 | Roche et al. | 358/426.01 |
| 5,196,946 A | 3/1993 | Balkanski et al. | |
| 5,231,484 A | 7/1993 | Gonzales et al. | |
| 5,341,318 A | 8/1994 | Balkanski et al. | |
| 5,477,272 A | 12/1995 | Zhang et al. | |
| 5,510,857 A | 4/1996 | Kopet et al. | |
| 5,537,155 A | 7/1996 | O'Connell et al. | |
| 5,581,302 A | 12/1996 | Ran et al. | |
| 5,699,129 A | 12/1997 | Tayama | |
| 5,731,850 A | 3/1998 | Maturi et al. | |
| 5,793,985 A | 8/1998 | Natarajan et al. | |
| 5,801,776 A | 9/1998 | Tamura et al. | |
| 5,818,969 A | 10/1998 | Astle | |
| RE36,015 E | 12/1998 | Iu | |
| 6,014,181 A | 1/2000 | Sun | |
| 6,031,937 A | 2/2000 | Graffagnino | |
| 6,081,297 A | 6/2000 | Lee | |
| 6,081,553 A | 6/2000 | Kitson et al. | |
| 6,101,276 A | 8/2000 | Adiletta et al. | |

(Continued)

FOREIGN PATENT DOCUMENTS

EP   0963108   12/1999

(Continued)

OTHER PUBLICATIONS

Search Report dated Jan. 31, 2006 in Application No. GB0407320.1.

(Continued)

*Primary Examiner*—Nhon T Diep
(74) *Attorney, Agent, or Firm*—Kolisch Hartwell, PC

(57) ABSTRACT

A video compression system includes first and second dual-port memory devices, a third memory device, and first and second processors that may provide enhanced processing, including motion estimation. The first processor may be configured to store in the second memory device first and second video frames and to transfer sequential sets of data from the first video frame corresponding to fields of search. A second set of a plurality of adjacent macroblocks of the second video frame may be compared to macroblocks selected from the field of search. Dual-port memory devices may allow for the concurrent use of shared memory by the two processors as well as data transfer during processing.

22 Claims, 8 Drawing Sheets

U.S. PATENT DOCUMENTS

| | | | |
|---|---|---|---|
| 6,163,576 A * | 12/2000 | Lempel | 375/240.24 |
| 6,188,728 B1 | 2/2001 | Hurst | |
| 6,256,350 B1 | 7/2001 | Bishay et al. | |
| 6,333,951 B1 | 12/2001 | Tamura et al. | |
| 6,363,117 B1 | 3/2002 | Kok | |
| 6,421,466 B1 | 7/2002 | Lin | |
| 6,525,783 B1 | 2/2003 | Kim et al. | |
| 6,574,273 B1 * | 6/2003 | Luna et al. | 375/240 |
| 6,996,179 B2 * | 2/2006 | Rovati et al. | 375/240.16 |
| 2001/0048718 A1 | 12/2001 | Bruls et al. | |
| 2002/0039386 A1 | 4/2002 | Han et al. | |
| 2002/0101930 A1 * | 8/2002 | Wang et al. | 375/240.23 |
| 2002/0112119 A1 | 8/2002 | Halbert et al. | |
| 2002/0131502 A1 | 9/2002 | Monro et al. | |
| 2002/0136302 A1 | 9/2002 | Lu | |
| 2002/0136306 A1 | 9/2002 | Frojdh et al. | |
| 2002/0176502 A1 | 11/2002 | Rose et al. | |
| 2003/0039309 A1 | 2/2003 | Mihara | |

FOREIGN PATENT DOCUMENTS

| | | |
|---|---|---|
| GB | 2365246 | 2/2002 |
| GB | 2378345 | 3/2002 |
| WO | WO9323816 | 11/1993 |
| WO | WO0108402 A2 | 2/2001 |

OTHER PUBLICATIONS

Search Report dated Jul. 16, 2004 in Application No. GB0407320.1
Kuhn, Peter, *Algorithms, Complexity Analysis and VLSI Architectures for MPEG-4 Motion Estimation*, Kluwer Academic Publishers, pp. 29-40, 119-121, 126-136, and 147-188, 1999.
Bhaskaran, Vasudev and Konstantinides, Konstantinos, *Image and Video Compression Standards Algorithms and Architectures*, Second Edition, Kluwer Academic Publishers, pp. 100-105, 116-131, 180-191, 271-281, and 283-295, 1997.
Pearson, Don, *Image Processing*, McGraw-Hill Book Company, pp. 172-173, 1991.

* cited by examiner

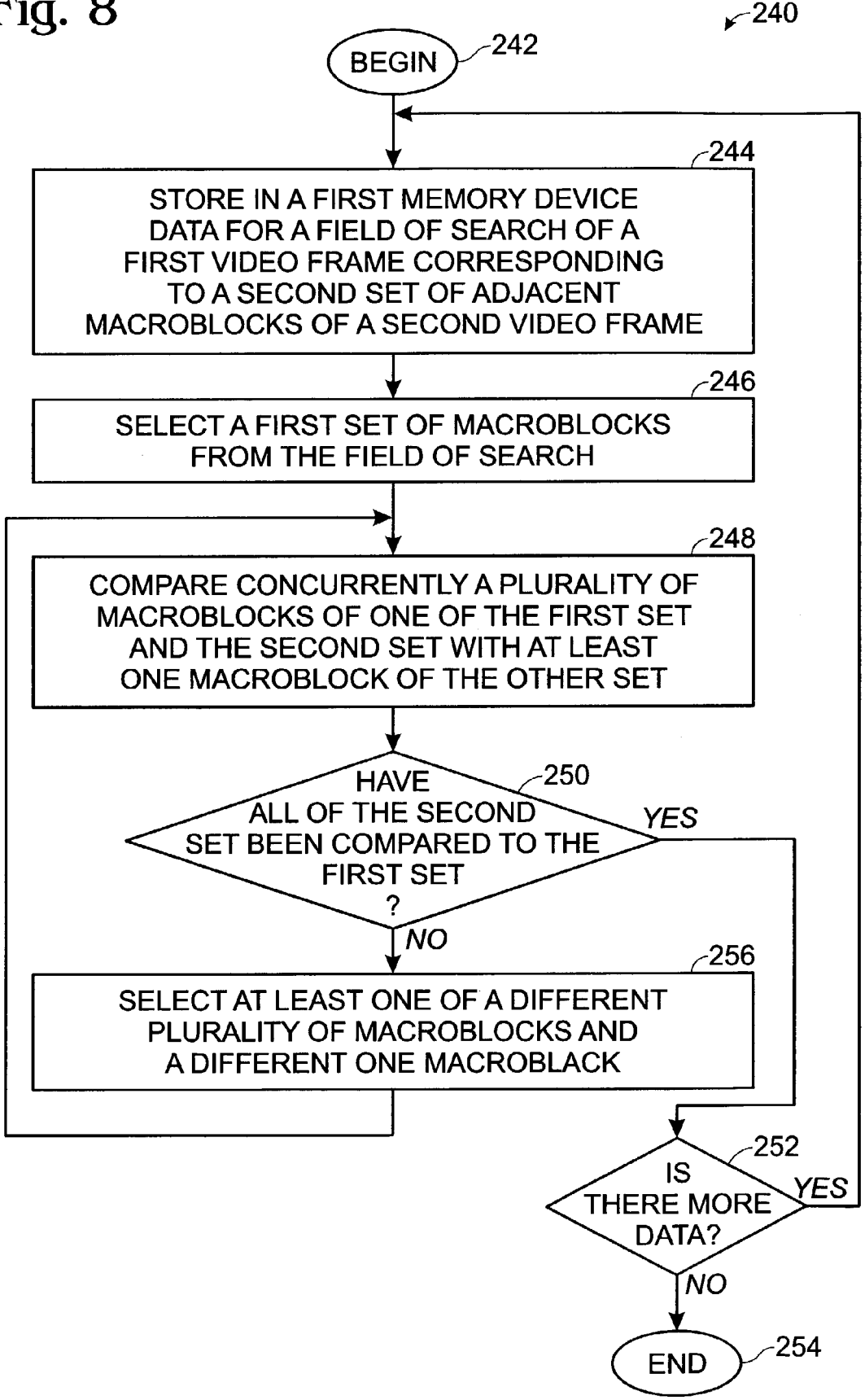

VIDEO COMPRESSION METHOD AND APPARATUS

BACKGROUND OF THE INVENTION

The present invention relates to video compression, and in particular to video compression with multiple unit processing.

Digital video is the format commonly used with personal computers, digital-video cameras, and other electronic systems. Since a huge amount of memory or storage space is required to fully store all 30 or more frames per second of video, the images are usually compressed. Often sequential images in the video sequence differ only slightly. The difference from a previous (or following) image in the sequence can be detected and encoded, rather than the entire picture using a compression technique, such as MPEG encoding.

MPEG is a video signal compression standard, established by the Moving Picture Experts Group ("MPEG") of the International Standardization Organization. MPEG is a multistage algorithm that integrates a number of well known data compression techniques into a single system. These include motion-compensated predictive coding, discrete cosine transform ("DCT"), adaptive quantization, and variable length coding ("VLC"). The main objective of MPEG is to remove redundancy that normally exists in the spatial domain (within a frame of video) as well as in the temporal domain (frame-to-frame), while allowing inter-frame compression and interleaved audio.

There are two basic forms of video signals: an interlaced scan signal and a non-interlaced scan signal. An interlaced scan signal is a technique employed in television systems in which every television frame consists of two fields referred to as an odd-field and an even-field. Each field scans the entire picture from side to side and top to bottom. However, the horizontal scan lines of one (e.g., odd) field are positioned half way between the horizontal scan lines of the other (e.g., even) field. Interlaced scan signals are typically used in broadcast television ("TV") and high definition television ("HDTV"). Non-interlaced scan signals are typically used in computer systems and when compressed have data rates up to 1.8 Mb/sec for combined video and audio. The Moving Picture Experts Group has established an MPEG-1 protocol intended for use in compressing/decompressing non-interlaced video signals, and an MPEG-2 protocol intended for use in compressing/decompressing interlaced TV and HDTV signals.

Before a conventional video signal may be compressed in accordance with either MPEG protocol it must first be digitized. The digitization process produces digital video data which specifies the intensity and color of the video image at specific locations in the video image that are referred to as pixels. Each pixel is associated with a coordinate positioned among an array of coordinates arranged in vertical columns and horizontal rows. Each pixel's coordinate is defined by an intersection of a vertical column with a horizontal row. In converting each frame of video into a frame of digital video data, scan lines of the two interlaced fields making up a frame of un-digitized video are interdigitated in a single matrix of digital data. Interdigitization of the digital video data causes pixels of a scan line from an odd-field to have odd row coordinates in the frame of digital video data. Similarly, interdigitization of the digital video data causes pixels of a scan line from an even-field to have even row coordinates in the frame of digital video data.

MPEG-1 and MPEG-2 each divides a video input signal, generally a successive occurrence of frames, into sequences or groups of frames ("GOF"), also referred to as a group of pictures ("GOP"). The frames in respective GOFs are encoded into a specific format. Respective frames of encoded data are divided into slices representing, for example, sixteen image lines. Each slice is divided into macroblocks each of which represents, for example, a 16×16 matrix of pixels. Each macroblock is divided into six blocks including four blocks relating to luminance data and two blocks relating to chrominance data. The MPEG-2 protocol encodes luminance and chrominance data separately and then combines the encoded video data into a compressed video stream. The luminance blocks relate to respective 8×8 matrices of pixels. Each chrominance block includes an 8×8 matrix of data relating to the entire 16×16 matrix of pixels, represented by the macroblock. After the video data is encoded it is then compressed, buffered, modulated and finally transmitted to a decoder in accordance with the MPEG protocol. The MPEG protocol typically includes a plurality of layers each with respective header information. Nominally each header includes a start code, data related to the respective layer and provisions for adding header information.

There are generally three different encoding formats which may be applied to video data. Intra-frame coding produces an "I" block, designating a block of data where the encoding relies solely on information within a video frame where the macroblock of data is located. Inter-frame coding may produce either a "P" block or a "B" block. A "P" block designates a block of data where the encoding relies on a prediction based upon blocks of information found in a prior video frame. A "B" block is a block of data where the encoding relies on a prediction based upon blocks of data from surrounding video frames, i.e., a prior I or P frame and/or a subsequent P frame of video data.

One means used to eliminate frame-to-frame redundancy is to estimate the displacement of moving objects in the video images, and encode motion vectors representing such motion from frame to frame. The accuracy of such motion estimation affects the coding performance and the quality of the output video. Motion estimation performed on a pixel-by-pixel basis has the potential for providing the highest quality video output, but comes at a high cost in terms of computational resources. Motion estimation can be performed on a block-by-block basis to provide satisfactory video quality with a significantly reduced requirement for computational performance.

These techniques are used for reducing the data required to store video signals, or for transmitting video signals over communication links having a smaller bandwidth than is required to transmit uncompressed video. Examples of such communication links includes local area networks, wide area networks, and circuit-switched telephone networks, such as integrated services digital network (ISDN) lines or standard telephone lines.

Video signal processing and video signal compression are variously described in *Video Demystified: A Handbook for the Digital Engineer*, Second Ed., by K. Jack, High Text Interactive, Inc., San Diego, Calif., U.S.A., 1996; *Image and Video Compression Standards: Algorithms and Architectures*, Second Edition, by V. Bhaskaran et al., Kluwer Academic Publishers, Norwell, Mass., U.S.A., 1997; *Algorithms, Complexity Analysis and VLSI Architectures for MPEG-4 Motion Estimation*, by P. Kuhn, Kluwer Academic Publishers, Dordrecht, The Netherlands, 1999; as well as in U.S. Pat. Nos. 6,421,466 B1; 6,363,117; 6,014,181; 5,731,850; and 5,510,857; and U.S. patent application Publication Nos. 2002/0176502 A1; and 2002/0131502 A1, all of which are incorporated in this description by reference.

BRIEF SUMMARY OF THE INVENTION

The present invention may be used in video signal processing, including compression. According to one aspect of the invention, a method of video compression may include processing video data according to a first video compression process, and writing processed data to a first memory device. While writing processed data, processed data from the memory device is read and processed by a second video compression process.

The method may be performed by a video compression system including a first memory device, and first and second processors. The first processor may be configured to process video data according to a first video compression process, and to write processed data to the memory device. The second processor may accordingly be configured to read video data processed by the first video compression process from the memory device while the first processor is writing processed data to the memory device. The second processor may then process the read data by a second video compression process.

Another feature of the invention may be practiced by storing in a first memory device data representative of at least a portion of a first video frame. Sets of data representative of corresponding portions of the frame may then be transferred sequentially from the first memory device to a second memory device. Each set of data stored in the second memory device may then be processed according to a video compression process. During processing of each set of data stored in the second memory device, a sequentially next set of data from the first memory device is transferred to the second memory device.

This process may be performed by a video compression system including first and second memory devices and a processor. The processor may be configured to store in the first memory device data representative of at least a portion of a first video frame, and to transfer sequential sets of data representative of corresponding portions of the frame from the first memory device to the second memory device. The processor may then process each current set of data stored in the second memory device according to the video compression process while transferring a sequentially next set of data from the first memory device to the second memory device.

Yet another aspect of the invention is directed to a video compression process that may include storing in a first memory device a set of data representative of a first field of search including a first set of a plurality of macroblocks of a first video frame. The first set of macroblocks is searched relative to a second set of a plurality of adjacent macroblocks of a second video frame. This searching may include comparing concurrently a plurality of macroblocks of one of the first and second sets with at least one macroblock of the other set. The plurality of macroblocks of the one set or the one macroblock of the other set may be changed and the comparison repeated. This may be used as part of a motion estimation algorithm. A system that may be used to perform this method may include a first memory device, and a processor.

BRIEF DESCRIPTION OF THE SEVERAL VIEWS OF THE DRAWINGS

FIG. 8 is a further flow chart of yet another process according to another aspect of the invention.

DETAILED DESCRIPTION OF METHODS AND EMBODIMENTS

Figure 1:
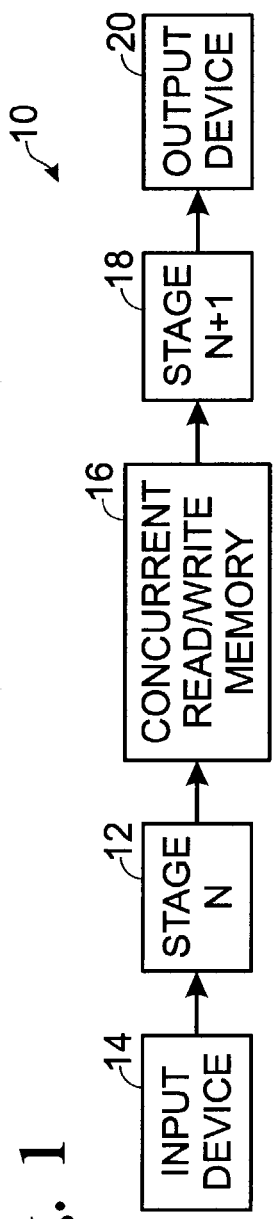
FIG. 1 is a general block diagram of a video compression system according to the invention.

As has been mentioned, the invention provides for video compression with multiple unit processing. This multi-unit processing may take various forms. In one form, it provides rapid serial processing of video compression functions. As an example, FIG. 1 illustrates a block diagram of a video compression system 10. System 10 includes a stage N processor 12 that receives video data from what is generally referred to as an input device 14. Device 14 may be any source of data, such as a communication medium or link, such as a cable or bus, a memory device, buffer, register, processor or other data functional or storage device. Processor 12 may be any process that processes video information, such as a processor that performs one or more functions relating to, for example, motion estimation, motion compensation, discrete-cosine transformation, quantization, and entropy encoding.

Figure 3:
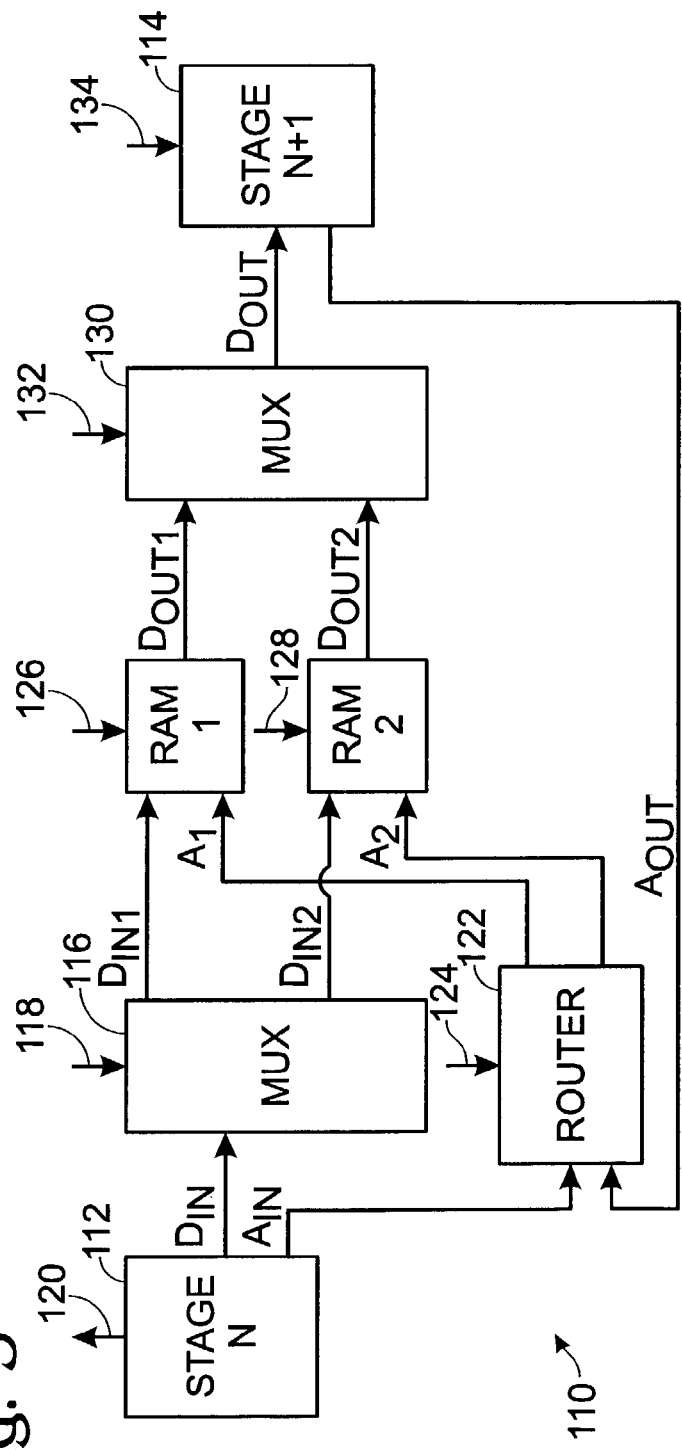
FIG. 3 is a general schematic of an alternative embodiment of a concurrent read/write memory that may be used in the system of FIG. 1.
Figure 2A:
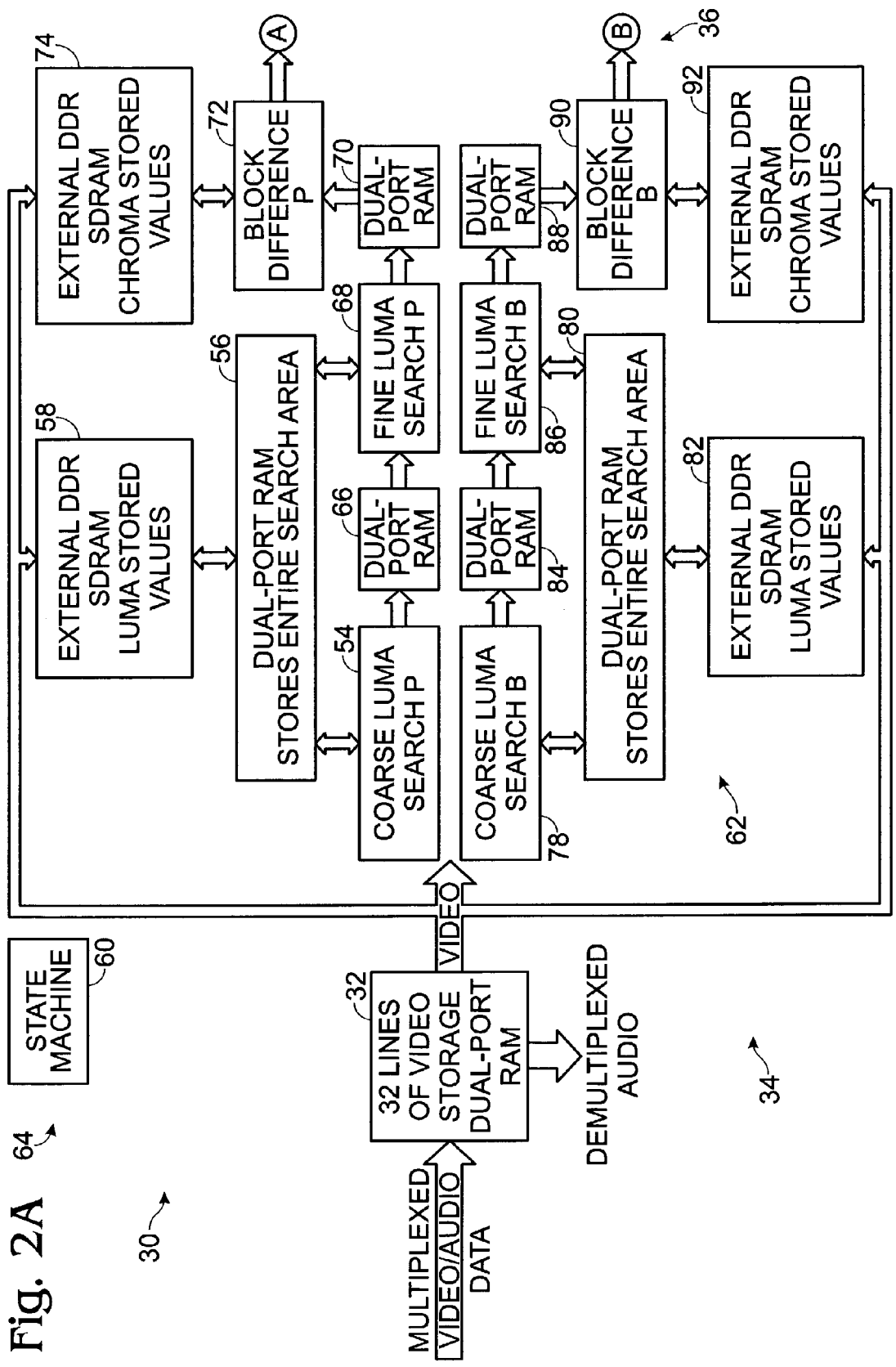
FIGS. 2A and 2B form a combined block diagram of an embodiment of the system of FIG. 1.
Figure 2B:
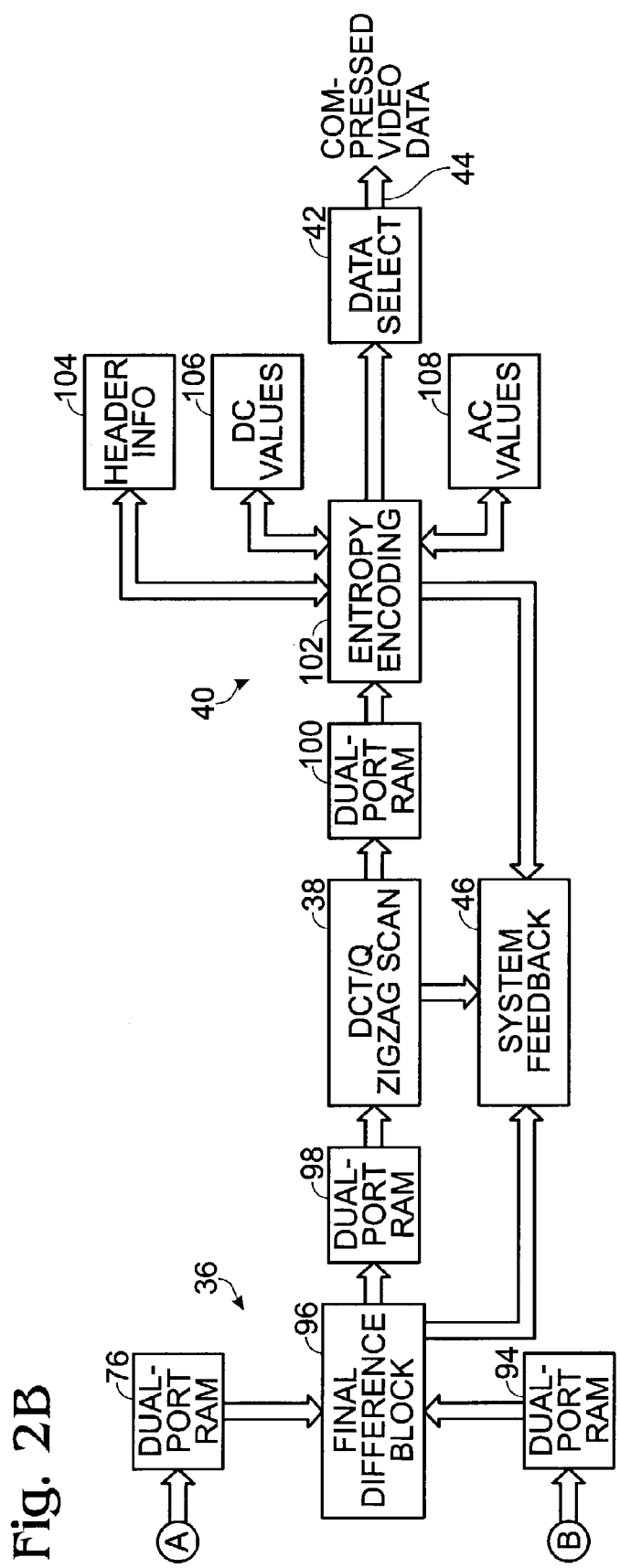

Processor 12 processes data received from input device 14 and writes or otherwise stores the processed data in a concurrent read/write memory device 16. Data may be written into memory device 16 at the same time as data previously stored in the device is read out. That is, reading and writing of data may occur concurrently. Any device, apparatus or combination of devices that provide this function may, in the general sense be used. Two examples of device 16 are illustrated in FIGS. 2A, 2B and 3, which are described below. Accordingly, data previously recorded in device 16 by processor 12 may be read into a stage N+1 processor 18. Processor 18 may process video data that has been processed previously by processor 12. For instance, processor 12 may perform motion estimation and compensation, and processor 18 may perform discrete cosine transform (DCT) and quantization in a video compression system. Other examples are given in the system illustrated in FIGS. 2A and 2B.

Once the processed data received by the stage N+1 processor is further processed, the data is output to what is generally referred to as an output device 20. Similar to device 14, output device 20 may be any destination for data, such as a communication medium or link, a memory device, buffer, register, processor or other device for processing, storing or transmitting data.

It will be appreciated then that processors 12 and 18 and intermediate memory provide a system that may allow for rapid transfer of data between the two processors while making the processors nearly independent. In an exemplary video compression application, processor 12 may be performing an Nth video compression process on an (N+1)th block of video data and progressively writing processed data out to memory device 16 during the processing. While processor 12 is writing data into memory device 16, processor 18 may be reading data associated with an Nth block of data that was previously processed by processor 12 and stored in the memory device. Processors 12 and 14 may thereby be able to function on the respective blocks of data without having to depend on or interact with the operation of the other processor. Each processing function may thereby be internally optimized.

A more detailed example of a video compression system 30 is illustrated in FIGS. 2A and 2B. These two figures together provide a general block diagram of a video compression system that may incorporate the features of system 10 just described. System 30 includes an input device 32, which may be a SDI interface that provides demultiplexing of multiplexed video/audio data, and stores, for example, 32 lines of video data in a dual-port RAM. The processing of the demultiplexed audio data is provided by conventional means and is not further discussed.

Included in system 30 is a motion estimator 34, a motion compensator 36, a DCT and quantization (DCT/Q) processor 38, an entropy encoder 40, and an output device 42. Output device 42 provides multiplexing and data selection to produce an output compressed video signal 44. A system feedback processor 46 may receive processing information from the motion compensator, DCT/Q processor and entropy encoder for controlling the rate of processing at each stage and the amount of data being generated at each stage. The feedback system may modify the operation of the processors in order to normalize the rate and quantity of coded data generation by system 30 so that the output video signal may maintain a target level of data output. Other than as described, these various functional processors may function conventionally, and further explanation is not provided.

Motion estimator 34 may receive a digital video signal 48 from input device 32 in the form of successive 16×16 pixel macroblocks. System 30 may process a slice of 16 lines of video at a time. Estimator 34 includes a P frame motion estimator 50 and a B-frame motion estimator 52. In applications where B frames are not determined, the B-frame motion estimator may not be used. In applications where only I frames are used, motion compensation would not be required. The I frames may be passed through the motion estimator and compensator without processing.

Referring now to P-frame estimator 50, successive luma macroblock data is input to a coarse luma search processor 54. Coarse processor 54 is coupled to a dual-port RAM 56 that may store an entire search area, also referred to as a field of search, of data of a previously processed reference I frame. RAM 56 may receive field of search data from an external DDR SDRAM 58 that may store data for four frames. Processor 54 may provide for transfer of data to RAM 56 and SDRAM 58, but when a state machine 60 or other processor provides this function, the functional requirements of processor 54 may be reduced. Accordingly, one may refer to a general processor 64 that includes the functionality of processors 54 and 60.

SDRAM 58 is referred to as an external device because a single chip 62 may include all of the structure shown for system 30, except for the external DDR-SDRAM's. An example of such a chip is a field-programmable gate array (FPGA) sold under the proprietary name of Xilinx® Virtex-II®, available from Xilinx, Inc. of San Jose, Calif., U.S.A.

As is explained further below with reference to FIG. 4, the course processor 54, as part of a hierarchical search, may select a best match for each macroblock or group of current macroblocks of a P frame, for which motion estimation is being performed, relative to a reference field of search. There are various known algorithms that may be used for selecting a best match. One such method is the computation of the sum of the absolute differences (SAD) between a current macroblock and a reference macroblock. The reference macroblock that has the lowest SAD value may then be considered to be the best match. The results are output to a dual-port RAM 66. Data may by read into RAM 66 at the same time that previously stored data is read out of it. In this case, data associated with a previous coarse search is read from RAM 66 by a fine luma search processor 68.

For each given current macroblock, processor 68 may perform a further search in more detail in a reduced field of search centered on the best match identified in the previous stage of the motion estimation. The field of search may be a portion of the field of search used in the coarse search. This field of search data is also read out of RAM 56. Since RAM 56 is a dual-port RAM, processor 68 may access RAM 56 while processor 54 is accessing RAM 56. This allows for simultaneous data transfer from a single memory device and relatively independent functioning of the processors.

A replacement best match may be found within this reduced field of search and the results passed on to another dual-port RAM 70. Previously stored data is output from RAM 70 to a block difference processor 72 forming part of motion compensator 36. Processor 72 may compute a motion vector based on the position differences between each current macroblock and the associated best-fit reference macroblock determined during motion estimation. This motion vector is based on luma values. Differences between the chroma values for each pair of current and reference macroblocks is also determined. The chroma values may be obtained from an external DDR SDRAM 74 having stored chroma values corresponding to the frames for which SDRAM 58 stores luma values. The difference values are written into a dual-port RAM 76.

B-frame motion estimator 52 includes elements that are mirror images of elements contained in P-frame motion estimator 50. Accordingly, estimator 52 includes a coarse search processor 78, dual-port RAM 80 storing the current field of search of a reference frame and an external DDR SDRAM 82. A dual-port RAM 84 couples search processor 78 with a fine search processor 86. The output of processor 86 is stored in a dual-port RAM 88. A block difference processor 90 of motion compensator 36 reads data stored in RAM 88 and in an external DDR SDRAM 92. The block difference data is written into a dual-port RAM 94.

A final difference block 96 reads data from both RAM's 76 and 94. The reason for this is that frames treated as a B-frames have motion estimation determined by B-frame motion estimator 52, and also by P-frame motion estimator 50, as though the frame was a P-frame. Final difference block 96 compares the results of the two motion estimation and compensation processes and determines which one provides the better match between the current frame and the respective reference frame. The one with a better match is used and the other is disregarded.

Dual-port RAM's also provide interfaces between the remaining stages of video compression system 30. A RAM 98 is disposed between processors 96 and 38, and a RAM 100 is disposed between processors 38 and 40.

Entropy encoder 40 includes an entropy encoding processor 102 that is coupled to registers 104, 106 and 108 that provide, respectively, header information, DC values and AC values for data to be transmitted. The compressed video data and associated components of a compressed video signal are transmitted to data select processor 42 for production of the data stream that becomes video signal 44 transmitted over a communication link to a video receiver.

Concurrent read/write memory devices may be in the form of the dual-port RAM's illustrated in FIG. 2. Additionally, they may formed of a combination of components that provide for concurrent reading and writing. Such a memory device is shown generally at 110 in FIG. 3. Memory device 110 couples a stage N processor 112 to a stage N+1 processor 114. Processor 112 outputs data $D_{IN}$ to an address $A_{IN}$. Processor 114 inputs data $D_{OUT}$ received from an address $A_{OUT}$. A multiplexer 116 receives the data $D_{IN}$ and outputs it to one of output lines $D_{IN1}$, and $D_{IN2}$, based on a control signal 118 received from a state machine (not shown) based on a control signal 120 output from processor 112. The multiplexer writes successive sets of data alternately to a RAM 1 and a RAM 2. The address lines from processors 112 and 114 are input to a router 122. The router outputs a received input address to either an address line A1 connected to RAM 1 or to an address line A2 connected to RAM 2 based on a received control signal 124. Each of RAM 1 and RAM 2 either read received data or write stored data based on respective control signals 126 and 128. Data is read out from RAM 1 and RAM 2 on respective data lines $D_{OUT1}$, and $D_{OUT2}$ connected to inputs on a multiplexer 130. This multiplexer then outputs the data received on either of these data lines on data line $D_{OUT}$ based on a control signal 132. The operation of stage N+1 processor 114 is coordinated with the operation of stage N processor by a control signal 134.

Memory device 110, in the general sense, allows processor 112 to write data to one RAM while processor 114 reads data from the other RAM, and both RAM's may receive data from processor 112 and may output data to processor 114. However, because the address lines must be coordinated, as shown, both processors may not address both RAM's at the same time. This configuration provides for separate functioning of the two processors and their operations do not require that one be completed before the other can begin.

Figure 4:
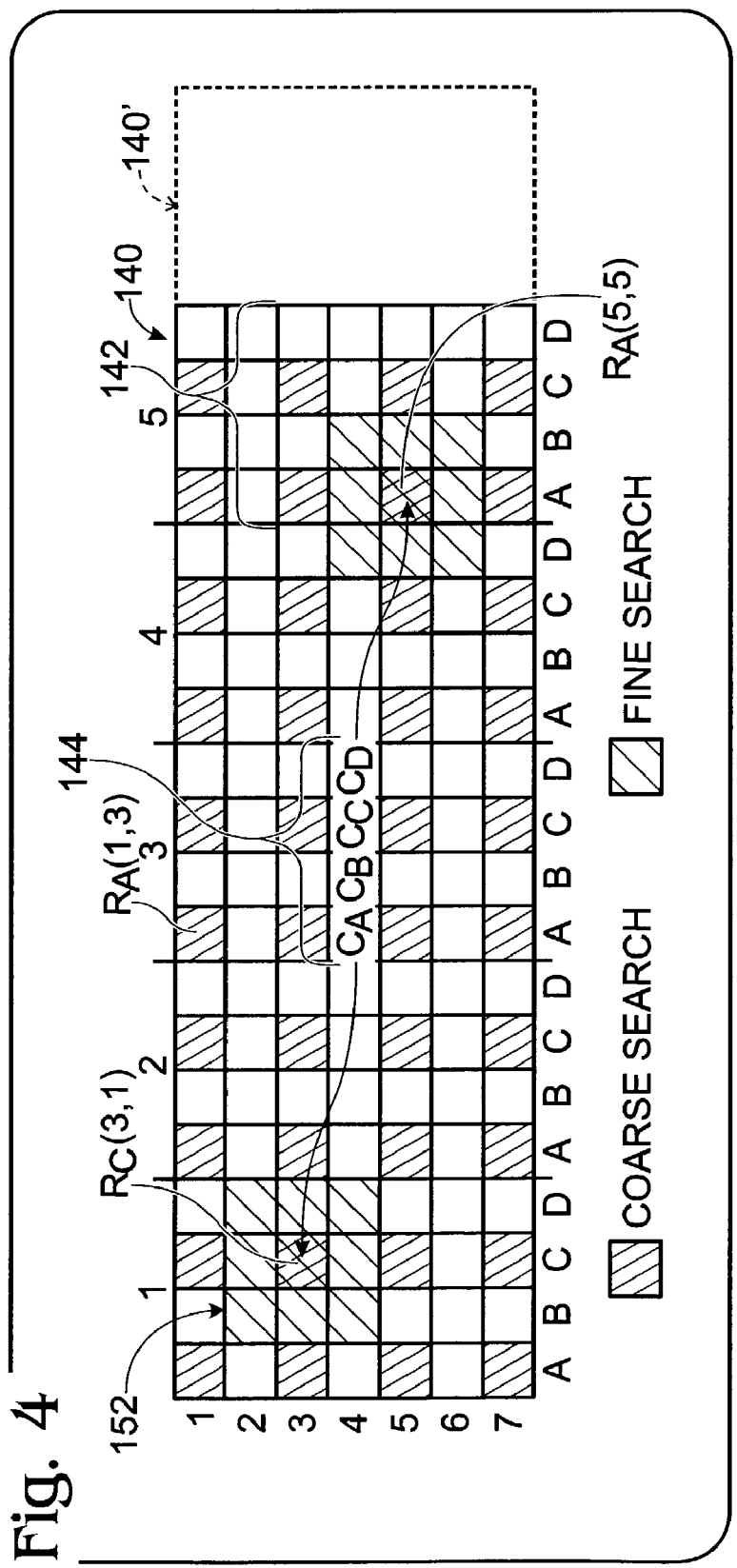
FIG. 4 is a diagram illustrating a search algorithm associated with a field of search according to yet another embodiment of the invention.

Referring now to FIG. 4, coarse processor 54 may use a coarse field of search as shown generally at 140. This discussion is directed specifically to P-frame motion estimator 50, although it may be equivalently applied to B-frame motion estimator 52. The size of the field of search may be based on the amount of time required to read the data into dual-port memory 56 and the amount of time it takes to conduct the search. The complete field of search 140 may be stored in the dual-port memory 56 for direct access by processor 54.

In determining motion estimation for a P frame, the reference frame is an I frame. Field 140 is shown as an array of seven rows by twenty columns. The columns may be considered as five groups of four columns each. The columns in each group are designated as columns A, B, C and D. The array may thus be considered to be an array of sets of four adjacent macroblocks. For instance, a group 142 of four macroblocks in column 5 of the array includes reference macroblocks designated $R_A(5,3)$, $R_B(5,3)$, $R_C(5,3)$ and $R_D(5,3)$. In the center of the array are four adjacent macroblocks identified as $C_A$, $C_B$, $C_C$ and $C_D$. Macroblocks $C_A$, $C_B$, $C_C$ and $C_D$ are not part of array 140, but rather form a set 144 of macroblocks of a current frame for which motion estimation is being determined. The macroblocks in current set 144 have positions in the current frame corresponding to positions $R_A(3,4)$, $R_B(3,4)$, $R_C(3,4)$ and $R_D(3,4)$ of array 140. That is, a field of search is selected, in this case, that is +/−3 rows of macroblocks vertically and +/−2 columns of four-macroblock sets horizontally.

The macroblocks in current set 144 may each be compared concurrently to each of the macroblocks shaded as shown. This is a summary form of designation. As is well known in the art, one macroblock is compared to another macroblock by comparing corresponding pixel values in both macroblocks. The shaded macroblocks correspond to every other macroblock in every other row. Other search strategies, such as every other macroblock in every row or different search field configurations, may be used depending on the requirements of a particular application. Further, the search field may take configurations other than a rectangular array. Table I below illustrates the steps in a coarse motion estimation search for four macroblocks $C_A$, $C_B$, $C_C$ and $C_D$.

TABLE I

COARSE SEARCH

| STEP | MB | | | |
|------|---------|---------|---------|---------|
|  | $C_A$ | $C_B$ | $C_C$ | $C_D$ |
| 1 | $R_A(1,1)$ | $R_A(1,1)$ | $R_A(1,1)$ | $R_A(1,1)$ |
| 2 | $R_C(1,1)$ | $R_C(1,1)$ | $R_C(1,1)$ | $R_C(1,1)$ |
| 3 | $R_A(3,1)$ | $R_A(3,1)$ | $R_A(3,1)$ | $R_A(3,1)$ |
| 4 | $R_C(3,1)$ | $R_C(3,1)$ | $R_C(3,1)$ | $R_C(3,1)$ |
| . | . | . | . | . |
| . | . | . | . | . |
| . | . | . | . | . |
| 37 | $R_A(5,5)$ | $R_A(5,5)$ | $R_A(5,5)$ | $R_A(5,5)$ |
| 38 | $R_C(5,5)$ | $R_C(5,5)$ | $R_C(5,5)$ | $R_C(5,5)$ |
| 39 | $R_A(7,5)$ | $R_A(7,5)$ | $R_A(7,5)$ | $R_A(7,5)$ |
| 40 | $R_C(7,5)$ | $R_C(7,5)$ | $R_C(7,5)$ | $R_C(7,5)$ |

It is seen that each selected reference macroblock R(J,K) is compared concurrently to each of the four macroblocks in current group 144. These steps continue until each of the current macroblocks are compared to each of the selected reference macroblocks. As has been mentioned, the comparison may be of a minimum function, such as the minimum sum of the absolute differences for each pair of macroblocks compared. As a result of the coarse search, a best match is determined for each current macroblock. The best match may be different for the four current macroblocks. For instance, reference macroblock $R_C(3,1)$ may be the best match for macroblock $C_A$, and reference macroblock $R_A(5,5)$ may be the best match for macroblock $C_D$.

Once the best matches are selected by coarse processor 54, the results are stored in RAM 66. Processor 54 then proceeds to perform the same coarse search for the next four adjacent current macroblocks. Fine search processor 68 may be processing the previous set of four adjacent current macroblocks while processor 54 is performing a search for set 144. Processor 68 stores the results of its search in RAM 70 and then reads in from RAM 66 the results of the coarse search on current set 144. A different field of search is applied to the fine search. In this example, the field of search is a 3×3 macroblock square array, such as array 150 shown in FIG. 5. Array 150 as a result is a 48×48 pixel array. Other sizes of the field of search may be used. Array 150 may be contained within array 140 and may be centered on the position of the best fit macroblock $R_C$ associated with a current macroblock C. When array 150 is contained in array 140, the data is directly accessible from RAM 56. Further, since RAM 56 is a dual-port RAM, processors 54 and 68 may access the data concurrently, thereby making the data available from a single memory device. As an example of an array 150 and referring again to the example in FIG. 4, a fine field-of-search array 152 associated with current macroblock $C_A$ may be centered around reference macroblock $R_C(3,1)$.

Rather than compare the current macroblock with alternate macroblocks, a finer or more dense, search is performed. Every macroblock embedded in the reduced array may be searched or fewer macroblocks may be searched, depending on the allocated time for computing the best match. As an example, Table II below illustrates the steps that may be used for performing a fine search of reduced array 150. In this table, each current macroblock $C_X$ is compared concurrently to a set of reference macroblocks $R_X(J,K)$. Each reference macroblock is designated by the location of the upper left pixel. In the example shown, macroblocks identified by alternate pixel locations in pixel rows and columns are searched.

TABLE II

FINE SEARCH

| | | | STEP | | | |
|---|---|---|---|---|---|---|
| MB | 1 | 2 | ... | 256 | 257 | ... 1024 |
| $C_A$ | $R_A(2,2)$ | $R_A(2,10)$ | | $R_A(32,26)$ | | |
| $C_A$ | $R_A(2,4)$ | $R_A(2,12)$ | | $R_A(32,28)$ | | |
| $C_A$ | $R_A(2,6)$ | $R_A(2,14)$ | | $R_A(32,30)$ | | |
| $C_A$ | $R_A(2,8)$ | $R_A(2,16)$ | | $R_A(32,32)$ | | |
| $C_B$ | | | | | $R_B(2,2)$ | |
| $C_B$ | | | | | $R_B(2,4)$ | ... |
| $C_B$ | | | | | $R_B(2,6)$ | |
| $C_B$ | | | | | $R_B(2,8)$ | |
| $C_C$ | | | | | | |
| $C_C$ | | | | | | ... |
| $C_C$ | | | | | | |
| $C_C$ | | | | | | |
| $C_D$ | | | | | | $R_D(32,36)$ |
| $C_D$ | | | | | ... | $R_D(32,28)$ |
| $C_D$ | | | | | | $R_D(32,30)$ |
| $C_D$ | | | | | | $R_D(32,32)$ |

Figure 5:
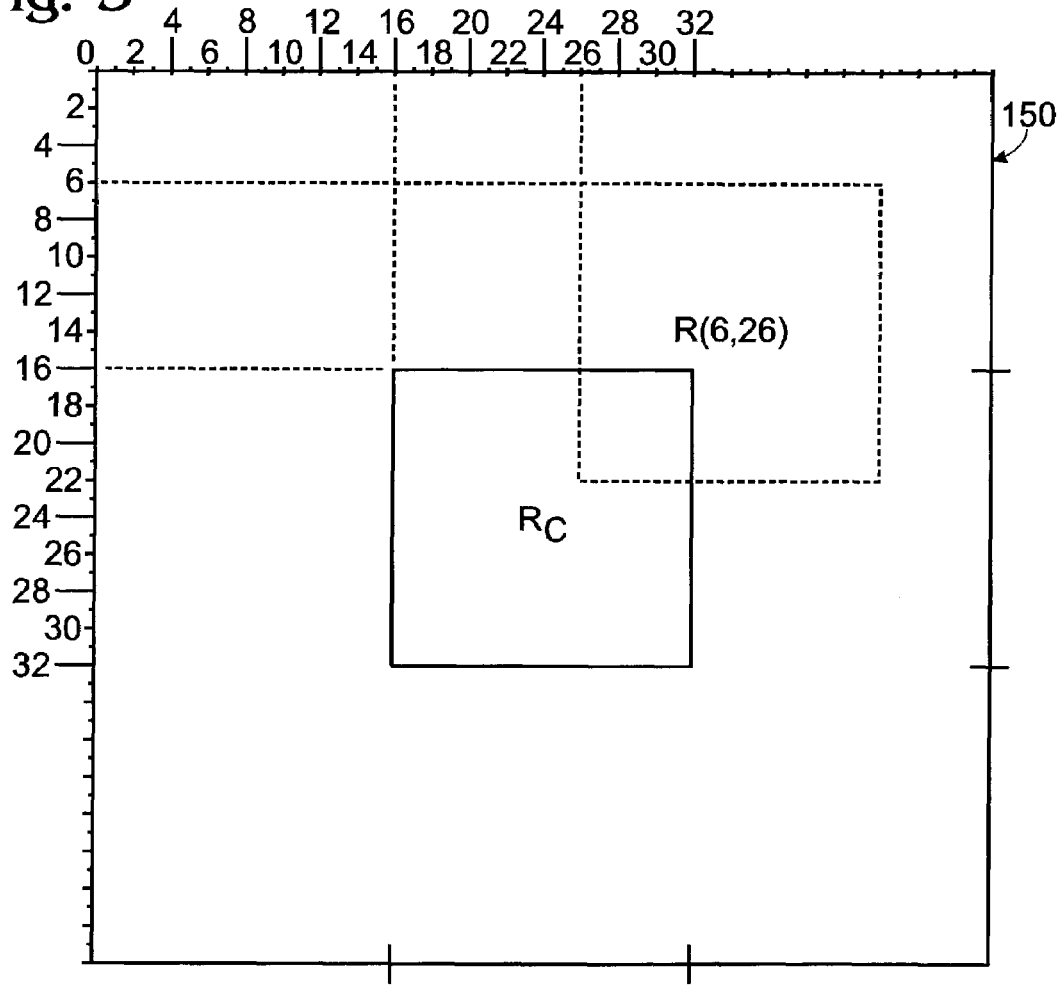
FIG. 5 is an enlarged illustration of a portion of the search field illustrated in FIG. 4 for practicing another embodiment of the invention.

The comparisons for the set of four current macroblocks are performed sequentially, since each one may be associated with a different reference macroblock. A new reference macroblock may be selected after the fine search process that has a lower SAD than the reference macroblock identified in the coarse search. Referring to FIG. 5, the reference macroblock identified in the coarse search corresponds in position to macroblock R(16,16). A new reference macroblock, such as macroblock R(6,26) may have the lowest SAD after the fine search process. This information is output to dual-port RAM 70.

It is seen that at the general functional level, the dual-port RAM's allow for concurrent use of a memory device by two sequentially adjacent processors, thereby permitting them to operate relatively independently. This gives the individual processors flexibility in functioning, having little dependency on the ongoing function of adjacent processors.

A further aspect of motion estimator 50 is that field-of-search data is fed into dual-port RAM 56 from SDRAM 58 while processors 54 and 68 are processing data. Since a next set of current macroblocks may have a field of search that overlaps with that of a current set, it may only be necessary to read in, during processing of a given set of current macroblocks, that data required for the next set. This additional data is illustrated by partial array 140' shown in FIG. 4. Thus, when processing of a current set N is complete, the data for the field of search for set N+1 has been entered, and processing on set N+1 may begin immediately.

Figure 6:
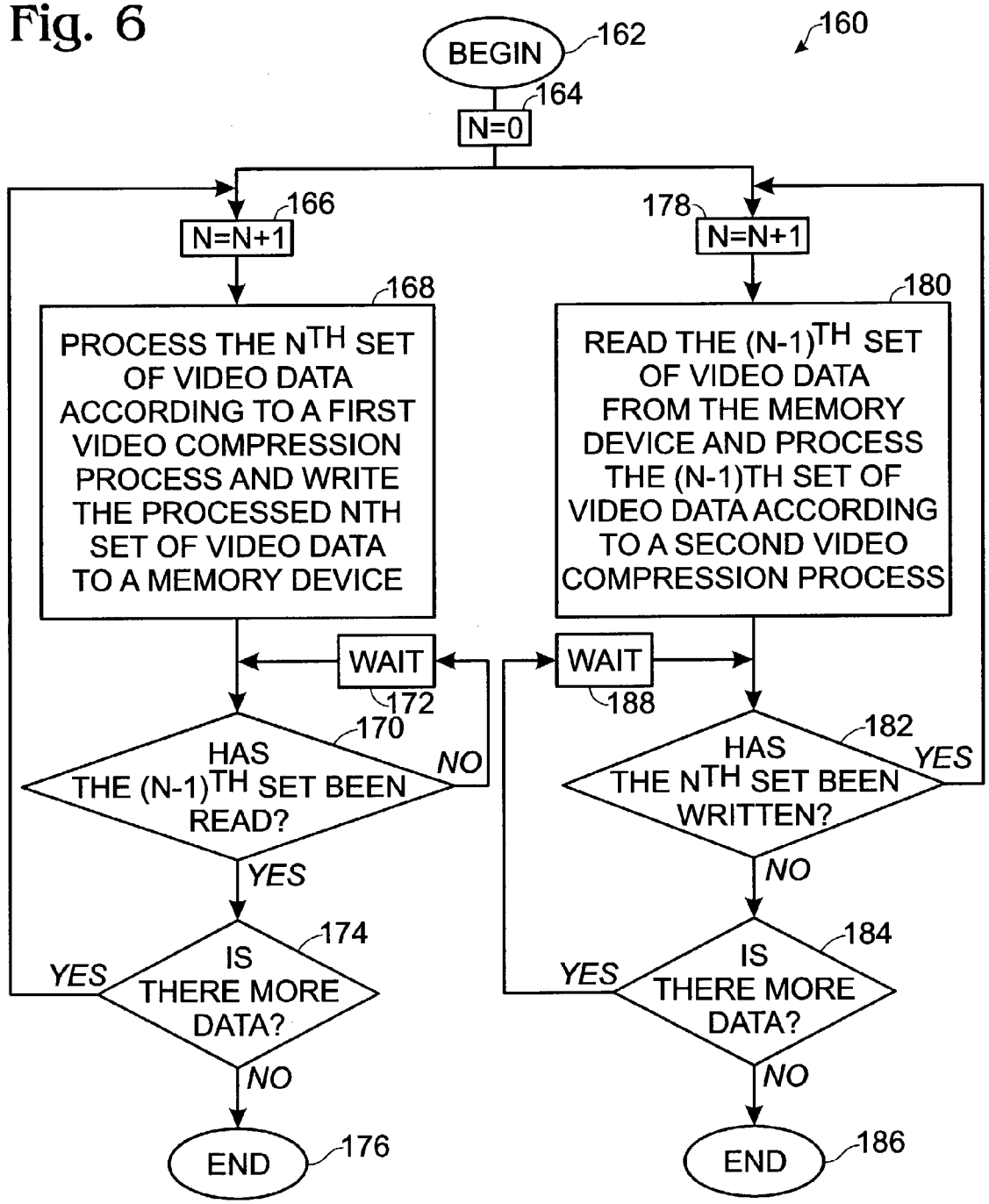
FIG. 6 is a flow chart of a process according to one aspect of the invention.

Referring now to FIG. 6, a method according to one aspect of the invention is shown generally at 160 in a simplified form for purposes of illustration. Method 160 may be directed to a method of sequential processing using an intermediate memory device. Beginning the method at 162, an index N may be initialized to N=0 at 164. The processing path then splits into two paths.

In the left path, the index N is incremented by 1 at 166. An $N^{th}$ set of video data is processed according to a first video compression process, such as those processes illustrated in system 30 shown in FIG. 2. The processed $N^{th}$ set of video data is written into a memory device. A determination is made at 170 whether an $(N-1)^{th}$ set has been read from the memory device. If it has not, further processing may be delayed at 172 to allow an increment of additional time to lapse. The determination at 170 is then repeated, and this cycle repeats until the $(N-1)^{th}$ set has been read. At that time, a determination is made at 174 as to whether there is more data to process. If not, processing is ended at 176. Otherwise, processing is continued and the index is again incremented at 166 and the process repeated.

In the right path, the index N is incremented by 1 at 178. An $(N-1)^{th}$ set of video data is read at 180 from the memory device and processed according to a second video compression process. A determination is then made at 182 whether an $N^{th}$ set has been written into the memory device. If so, processing is continued and the index is again incremented at 178 and the process repeated. If not, a determination is made at 184 as to whether there is more data to process. If not, processing is ended at 186. If there is more data, further processing may be delayed at 188 to allow an increment of additional time to lapse. The determination at 182 is then repeated, and this cycle repeats until the $N^{th}$ set of data has been written.

The respective steps of processing data and storing it in the memory device at 168, and reading the stored data and processing it at 180 may occur at the same time. Further, these processes may be independent of each other except with regard to the coordinating of the reading and writing of sequential sets of data into the memory device. The processes may also be sequential in that one set of data is first processed and then passed on to the second process step via the memory device for further processing. This sequential processing further allows the respective process steps to be internally optimized.

Figure 7:
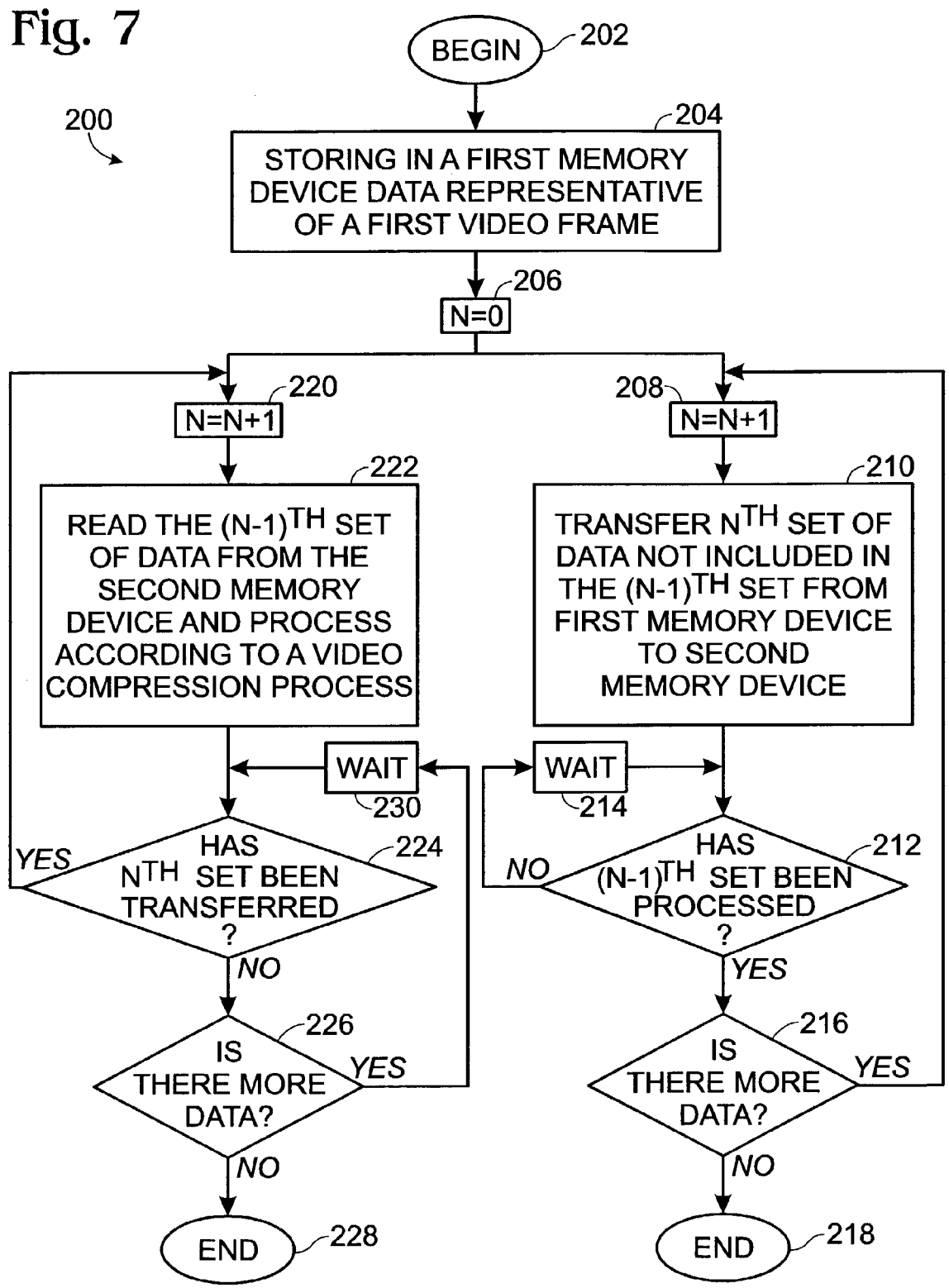
FIG. 7 is a flow chart of another process according to another aspect of the invention.

A second method according to another aspect of the invention is shown generally at 200 in FIG. 7. Method 200 may be directed to changing data in a memory device to allow relatively uninterrupted processing of the changing data. Once the method begins at 202, data representative of a first video frame is stored in a first memory device at 204. An index N is initialized to zero at 206 and then the method divides into two paths.

In the right path, the index N is incremented at 208. An $N^{th}$ set of data not included in a previously stored $(N-1)^{th}$ set of data may be transferred from the first memory device to a second memory device at 210. A determination may then be made at 212 as to whether the $(N-1)^{th}$ set of data has been processed. If it has not, further processing may be delayed at 214 to allow an increment of additional time to lapse. The determination at 212 is then repeated, and this cycle repeats until the $(N-1)^{th}$ set has been processed. Once it has been processed, a determination may be made at 216 as to whether there is more data. If so, processing is continued at 208 and the index is incremented at step 210 and the subsequent steps repeated. If there is no more data, the method ends at 218.

In the left path, the index N is incremented by 1 at 220. An $(N-1)^{th}$ set of video data is read at 222 from the second memory device and processed according to a video compression process. A determination may then be made at 224 whether an $N^{th}$ set has been transferred into the second memory device. If so, processing is continued and the index is again incremented at 220 and the process repeated. If not, a determination is made at 226 as to whether there is more data to process. If not, processing is ended at 228. If there is more data, further processing may be delayed at 230 to allow an increment of additional time to lapse. The determination at 224 is then repeated, and this cycle repeats until the $N^{th}$ set of data has been written into the second memory device.

The respective steps of transferring data into the second memory device at 210 and reading the stored data and processing it at 222 may occur at the same time. Further, these processes may be independent of each other except with regard to the coordinating of the reading and writing of the data into the second memory device. The processes may be performed on sequential sets of data in that one set of data is first transferred to the second memory device and then the stored data is processed. This processing of sequential sets of data may also allow these respective process steps to be internally optimized.

Referring now to FIG. 8, yet another method, shown generally at 240, according to another aspect of the invention is shown. Method 240 may be directed to performing motion estimation on a plurality of adjacent macroblocks of a current frame with concurrent processing of a plurality of macroblocks. The method may begin at 242 followed by storing, at 244, in a first memory device, data for a field of search of a first video frame corresponding to a second set of adjacent macroblocks of a second video frame. The first video frame may be a reference frame, such as an I frame or a P frame. The second video frame, referred to as a current frame, may be a P frame or a B frame, depending on the motion estimation process being used.

A first set of macroblocks may be selected from the field of search at 246. At 248, a plurality of macroblocks of one of the first and second sets may be compared concurrently with at least one macroblock of the other set. A determination may then made at 250 as to whether all of the second set has been compared to the first set. If so, a determination may be made at 252 as to whether there is more data. If not, the process may be ended at 254. Otherwise, processing may return to step 244 for a new field of search. If it is determined in step 250 that all of the second set has not been compared, then at least one of a different plurality of macroblocks and a different one macroblock may be selected at 256. Processing is then returned to step 248 and the process continued.

By processing concurrently a plurality of macroblocks, motion estimation may occur at a very rapid rate. Further, by providing motion estimation of a plurality of adjacent macroblocks of a current video frame, motion estimation may be further expedited, as compared to processing one current-frame macroblock at a time.

Although several processors have been identified separately in this description, these processors may be combined or even further separated into various other combinations. Separate processors may provide for concurrent processing of data.

The preceding description is presented largely in terms of diagrams, algorithms, and symbolic representations of structure and processor operation. These descriptions and representations may be implemented and described as various interconnected distinct software modules, structures or features. This is not necessary, as software, firmware, and hardware may be configured many different ways, and may be aggregated into a single processor and program with unclear boundaries. Program modules, executed by one or more computers or other devices, include routines, programs, objects, components, data structures that perform particular tasks or implement particular abstract data types. The functionality of program modules may be combined or distributed as desired in various embodiments.

An algorithm is generally considered to be a self-consistent sequence of steps leading to a desired result. These steps require physical manipulations of physical quantities. Usually, though not necessarily, these quantities may take the form of electrical or magnetic signals capable of being stored, transferred, combined, compared, and otherwise manipulated. As a convention, these signals may be referred to as bits, values, elements, symbols, characters, images, terms, numbers, or the like. These and similar terms may be associated with appropriate physical quantities and are convenient labels applied to these quantities.

Processes realizable in the form of computer programs may be stored in any computer-readable medium. Computer-readable media may be any available media that may be accessed by a computer. By way of example, computer-readable media may comprise volatile and non-volatile, removable and non-removable media implemented in any method or technology for storage of information such as computer-readable instructions, data structures, program modules, or other data. Computer-readable media may further include RAM, ROM, EEPROM, flash memory or other memory technology, CD-ROM, digital versatile disks (DVD) or other optical storage medium, magnetic cassettes, magnetic tape, magnetic disk storage or other magnetic storage devices, or any other medium that may be used to store information and that may be accessed by a computer.

The present invention also relates to apparatus for performing operations. This apparatus may be specially constructed for the required purposes or it may comprise a general-purpose computer selectively activated or reconfigured by a computer program stored in the computer or other apparatus. In particular, various general-purpose machines may be used with programs in accordance with the teachings described, or it may prove more convenient to construct more specialized apparatus to perform the required method steps.

The programs described need not reside in a single memory, or even a single machine. Various portions, modules or features of them may reside in separate memories, or even separate machines. The separate machines may be connected directly, or through a network, such as a local access network (LAN), or a global network, such as what is presently known as the Internet™.

While the present invention has been particularly shown and described with reference to the foregoing embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

The invention claimed is:

1. A video compression system comprising:

a first memory device;

a dual-port second memory device;

a third memory device;

a first processor configured to read video data from the first memory device, to process the read video data in a manner altering the read video data according to a first video compression process, and to write data processed by the first processor to the dual-port second memory device; and a second processor configured to read video data processed by the first video compression process from the dual-port second memory device while the first processor is writing processed data to the dual-port second memory device, to process the data read by the second processor in a manner altering the read video data according to a second video compression process, and to write the data processed by the second processor to the third memory device.

2. The system of claim 1, where the first and second processes include at least one of motion estimation, motion compensation, discrete-cosine transformation, quantization, and entropy encoding.

3. The system of claim 2, where at least one of the first and second processes includes motion estimation, and further includes a stage of a hierarchical search.

4. The system of claim 2, where the first and second processes include motion estimation having overlapping fields of search, the system further comprising a fourth memory device configured to store video data representative of the combined fields of search of the first and second processes, the first and second processors further configured to read data stored in the fourth memory device.

5. The system of claim 4, where the first and second processors are configured to read concurrently data from the fourth memory device.

6. The system of claim 4, further comprising a fifth memory device coupled to the fourth memory device for storing a plurality of frames of the video data, and a third processor configured to write data into the fifth memory device and transfer data from the fifth memory device to the fourth memory device.

7. The system of claim 6, where the first processor processes a first set of data for a first frame while the field of search for a subsequent set of data for the first frame is being written into the fourth memory device.

8. A video compression system comprising:
first and second dual-port memory devices;
a third memory device;
a first processor configured to store in the second dual-port memory device data representative of first and second video frames, to transfer sequential sets of data representative of corresponding portions of the first frame from the second dual-port memory device to the third memory device, each set of data representative of a first field of search including a first set of a plurality of macroblocks of a first video frame, and to process each set of data stored in the third memory device according to a first motion estimation process, the first motion estimation process including searching the first set of macroblocks relative to a second set of a plurality of adjacent macroblocks of a second video frame, the first motion estimation process being performed while transferring, from the second dual-port memory device to the third memory device, a portion of a sequentially next set of data not included in the set of data currently stored in the third memory device, the first processor further being configured to write processed data processed according to the first motion estimation process to the first dual-port memory device; and a second processor configured to read video data processed by the first processor from the first dual-port memory device while the first processor is writing processed data to the first dual-port memory device, and process the read data by a second motion estimation process including searching an associated plurality of macroblocks selected from the first set of macroblocks, relative to each macroblock of the second set of macroblocks, and comparing sequentially each macroblock in the second set with overlapping macroblocks included in the data corresponding to an associated plurality of macroblocks selected from the first set, and comparing each macroblock of the second set concurrently with a plurality of macroblocks from the first set.

9. A method of compressing video data comprising:
reading video data from a first memory device;
processing the video data read from the first memory device in a manner altering the read video data according to a first video compression process;
writing to a dual-port second memory device the video data processed according to the first video compression process;
while writing the processed video data to the dual-port second memory device, reading the processed video data from the dual-port second memory device;
processing the video data read from the dual-port second memory device in a manner altering the read video data according to a second video compression process; and
writing the video data processed according to the second video compression process to a third memory device.

10. The method of claim 9, where processing the video data according to a first video compression process and processing the video data according to a second video compression process, each includes at least one of motion estimating, motion compensating, discrete-cosine transforming, quantizing, and entropy encoding.

11. The method of claim 9, where at least one of processing the video data according to a first video compression process and processing the video data according to a second video compression process includes motion estimating, and further includes performing a stage of a hierarchical search.

12. The method of claim 9, where processing the video data according to a first video compression process and processing the video data according to a second video compression process each includes motion estimating, and further includes searching with overlapping fields of search, the method further comprising storing video data representative of the combined fields of search in a fourth memory device, and reading data stored in the fourth memory device.

13. The method of claim 12, where processing the video data according to a first video compression process and processing the video data according to a second video compression process includes reading concurrently data from the fourth memory device.

14. The method of claim 12, further comprising storing a plurality of frames of the video data in a fifth memory device, and writing data into the fifth memory device and transferring data from the fifth memory device to the fourth memory device.

15. The method of claim 14, where processing the video data according to a first video compression process includes processing a first set of data for a first frame while writing into the fourth memory device a field of search for a subsequent set of data for the first frame.

16. The method of claim 9, where processing the video data according to a first video compression process includes writing a third set of processed data over a first set of processed data, and processing the video data according to a second video compression process includes reading a second set of processed data during writing of the third set of data.

17. A computer-readable medium readable by one or more processors and having embodied therein a program of computer-readable instructions that, when executed by the one or more processors, provide for:
   reading video data from a first memory device;
   processing the video data read from the first memory device in a manner altering the data according to a first video compression process;
   writing to a dual-port second memory device the video data processed according to the first video compression process;
   while writing the processed video data to the dual-port second memory device, reading the processed video data from the dual-port second memory device;
   processing the video data read from the dual-port second memory device in a manner altering the data according to a second video compression process; and
   writing the video data processed according to the second video compression process to a third memory device.

18. The computer-readable medium of claim 17, where processing the video data according to a first video compression process and processing the video data according to a second video compression process each includes at least one of motion estimating, motion compensating, discrete-cosine transforming, quantizing, and entropy encoding.

19. The computer-readable medium of claim 17, where at least one of processing the video data according to a first video compression process and processing the video data according to a second video compression process includes motion estimating, and further includes performing a stage of a hierarchical search.

20. The computer-readable medium of claim 17, where processing the video data according to a first video compression process and processing the video data according to a second video compression process each includes motion estimating, and further includes searching with overlapping fields of search, the instructions further provide for storing video data representative of the combined fields of search in a fourth memory device, and reading data stored in the fourth memory device.

21. The computer-readable medium of claim 20, where processing the video data according to a first video compression process and processing the video data according to a second video compression process includes reading concurrently data from the fourth memory device.

22. The computer-readable medium of claim 17, where processing the video data according to a first video compression process includes writing a third set of processed data over a first set of processed data, and processing the video data according to a second video compression process includes reading a second set of processed data during writing of the third set of data.

* * * * *